Dec. 22, 1959  N. P. VLANNES  2,917,943
ENERGY TRANSFER MECHANISMS
Filed Oct. 6, 1958
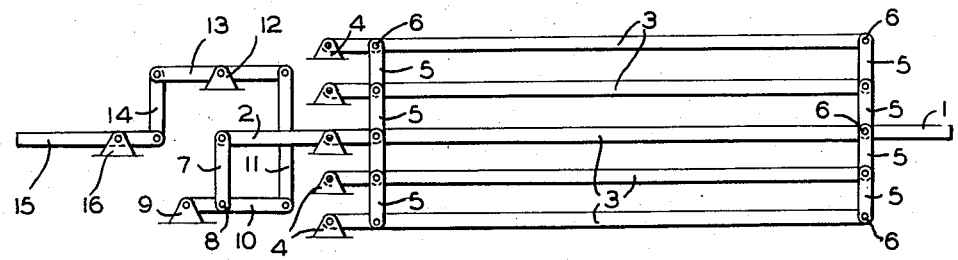
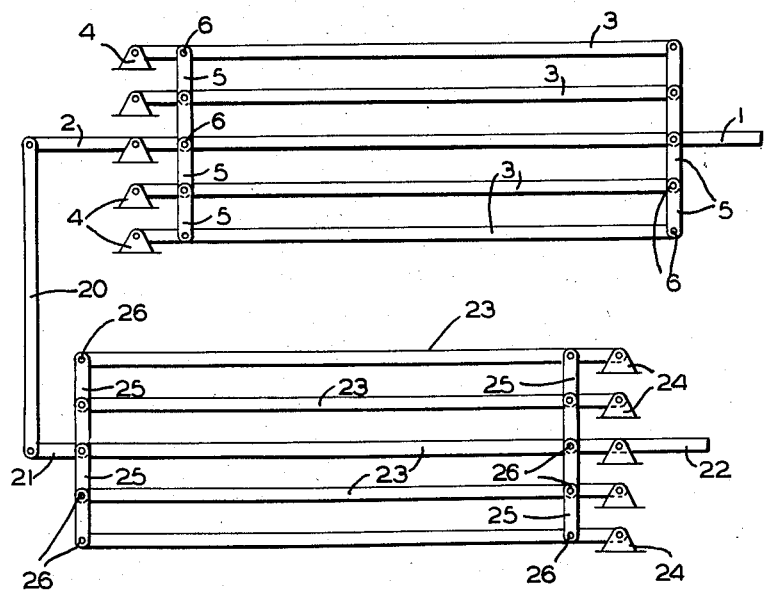
INVENTOR.
NICKOLAS P. VLANNES
BY Shanley & O'Neil
ATTORNEYS

United States Patent Office 2,917,943
Patented Dec. 22, 1959

2,917,943

ENERGY TRANSFER MECHANISMS

Nickolas P. Vlannes, Shreveport, La.

Application October 6, 1958, Serial No. 765,479

2 Claims. (Cl. 74—519)

This is a continuation-in-part of my application Serial No. 525,568, filed August 1, 1955.

The invention relates to improvements in apparatus for transmitting and/or modifying forces and motions.

An important object of the invention is to provide a novel mechanism for the transmittal of force or motion, which because of the force distribution principles employed, can be made of lighter structure than what would ordinarily be required.

Another important object of the invention is to provide a novel mechanism for integrating various input forces or motions into one or more output forces or motions.

Another object of the invention is to provide a novel mechanism for producing equal output forces from a series of unequal input forces or motions.

An additional object of the invention is to provide a novel mechanism for dividing a larger input force or motion into smaller component output forces or motions.

Another object of the invention is to provide a novel mechanical transmission for changing rotary motion into rectilinear motion or rectilinear motion into rotary motion.

In the accompanying drawings, forming a part of this specification, and in which like reference numerals are employed to designate like parts throughout, Figure 1 is a schematic illustration of my invention in one environment, and Figure 2 is a schematic illustration of my invention employed in another environment.

The invention provides a mechanical transmission system made up of driver means, follower means, and intermediate plural connective means so arranged than an input force applied to the driver means is distributed over the intermediate plural connective means and transmitted thereby to the follower means; and further provides a unique linkage operable to modify the output from the follower means for delivery of a precise force or motion to a responsive device.

Considering Figure 1, numeral 1 is used to designate a driver means such as an input arm, and numeral 2 is used to designate a follower means or output arm. Although single driver means and follower means are illustrated, it is to be expressly understood that multiple driver means and multiple follower means may be employed as described in detail hereinafter. Numeral 3 is used to designate lever arms and numeral 4 designates the fixed points of rotation or fulcrums for lever arms 3. Numeral 5 designates individual force transmitting rigid link means connected between adjacent lever arms while numeral 6 designates pivotal points allowing relative rotational motion between the lever arms and respective rigid link means. It will be understool that Figure 1 shows the use of five lever arms 3 merely as an illustration, that two or any greater number of lever arms could be used to accomplish the ends of the invention; the number of lever arms 3, of course, determines the number of fulcrums 4 and pivotal points 6 required. Additionally, Figure 1 as illustrated shows the use of two sets of force transmitting sets 5, however any number of such links may be used, the number and placement of such link means being dependent on the physical quantities involved, such as: force to be transmitted, distance the force is to be transmitted, and strength of materials used.

In the operation of the portion of Figure 1 thus far described: When a force is applied to driver means 1, it is distributed via the pivotal points 6 and force transmitting link means 5 to the lever arms 3, and transmitted via such intermediate devices to the follower means 2. For example, if a force of 500 pounds were applied to driver means 1 each of the lever arms via the rigid links would carry a force of 100 pounds which would ultimately be integrated, also via the rigid links and delivered to the follower means 2. To further illustrate how this distribution is effected, if the lever arm connected to the driver means 1 attempted to carry more of the force than the lever arm above it, it would not maintain its positional relation to the lever arm above, however, the rigid links hold the lever arms in fixed positional relationship so that the force is distributed to the various lever arms. For example, if a force sufficient to bend the lever arm, to which driver 1 is attached, is applied to driver 1, such lever arm would not bend, because rigid links 5 would transmit the force to the lever arms above and below it.

Within the scope of the invention is a device in which each of the lever arms is extended so that it has a driver means similar to that designated 1. When various forces or motions from different sources are applied to each one of the driver means, because of the intermediate connective devices of the invention, these various forces would be integrated and would appear as an integrated value on the follower means 2.

Also within the scope of the invention is a device in which the lever arms are extended at their fulcrum end to form additional follower means such as that designated by numeral 2. If the force of 500 pounds is applied to a single driver means 1, this force would be distributed to the follower means in amounts of 100 pounds each. Or an input of 500 foot pounds of work would have an output on each follower means of 100 foot pounds of work. Or as described in the previous paragraph, if numerous input arms were used and unequal forces were applied to each of them, they could be integrated and divided out so that each follower would have equal force on it. This ability of the invention to manipulate the input and output forces has numerous applications in mechanical and electromechanical devices.

Returning to Figure 1, a force or motion modifying linkage is driven by the follower 2. This linkage comprises a first rigid connecting arm 7 pivotally connected between follower 2 and a first lever 10. The first rigid connecting arm 7 is pivotally connected at 8 to first lever 10 which has its fulcrum at 9. The first lever 10 is connected via pivotably mounted second rigid connecting arm 11 to the second lever 13 having its fulcrum mounted intermediate its terminals at 12. The second lever 13 is connected via pivotably mounted third connecting arm 14 to the output lever 15 which has its fulcrum 16. In the linkage just described, the first, second and output levers may be adjustably mounted so that their individual "effective lever arms" or "effective moment" may be changed, thereby allowing modification of the output force from the follower means 2 so that the ultimate output on output lever 15 may be precisely regulated in any desired manner.

To illustrate the advantages of the linkage just described, this adjustable linkage would permit the modification of the force or motion delivered at follower 2 so that it could be used to actuate an indicating device while the follower means 2 delivers the working force or motion to a load device. If various forces or motions are integrated as described above and the output is on one follower means 2, the adjustable linkage just described would deliver an output to lever 15 which would remain in ratio to the sum total of the input to lever arms similar to driver 1. We have seen in the previous description how it is possible to distribute a force or several forces over different followers similar to 2, in which the followers would each have an equal output. With the adjustable linkage just described attached to each follower it would be possible to change the output of each in any manner desired. In effect then this enables one to take a single force, divide it into equal forces and then with the adjustable linkage obtain a number of outputs of unequal magnitude for use as desired.

The arrangement shown in Figure 2 comprises a mechanism including driver means, follower means 2, lever arms 3 and links 5 similar to that shown in Figure 1. An intermediate connector 20 delivers the output of follower means 2 to a driver means of a mechanism similar to that shown in Figure 1 but connected in reverse relationship, the latter mechanism, including lever arms 23 having fulcrums 24, force transmitting link means 25 connected to adjacent pairs of lever arms at pivotal points 26 and follower means 22.

Figure 2 illustrates that a series of units may be interconnected such that an input force may be transmitted over varying distances by adding or subtracting linkages. Aside from the other advantages of such an adaptable arrangement, the various linkages permit takeoffs at different points along the line of transmittal. It is to be understood that the various modifications of the arrangement of Figure 1 discussed above may also be employed in various combinations with the system shown in Figure 2.

It is to be understood that the invention is in no way limited by the drawings or the examples of operation given, and although the invention has been described in several environments it is to be expressly understood that various changes and substitutions may be made therein without departing from the spirit of the invention as well understood by those skilled in the art. Reference therefore will be had to the appended claims for a definition of the limits of the invention.

What is claimed is:

1. Energy transfer mechanism including driver means, follower means and mechanical advantage producing means connected between the driver means and the follower means, the mechanical advantage producing means including a plurality of spaced lever arms, pivot means connected to corresponding ends of the spaced lever arms for pivotal movement about their corresponding ends, a first set of transmitting links pivotally joined to the lever arms equally distant from the corresponding ends and interconnecting the spaced lever arms, and a second set of force transmitting links pivotally joined to the lever arms equally distant from the corresponding ends and interconnecting the spaced lever arms, the first set of transmitting links being adjacent the corresponding ends and being spaced from the second set by a distance greater than the distance between the first set and the pivot means.

2. In combination, a plurality of energy transfer mechanisms, each of the energy transfer mechanisms including driver means, follower means and mechanical advantage producing means connected between the driver means and the follower means, the mechanical advantage producing means including a plurality of spaced lever arms, pivot means connected to corresponding ends of the spaced lever arms to mount the lever arms for pivotal movement about their corresponding ends, a first set of transmitting links pivotally joined to the lever arms equally distant from the corresponding ends and interconnecting the spaced lever arms, a second set of force transmitting links pivotally joined to the lever arms equally distant from the corresponding ends and interconnecting the spaced lever arms, the first set of transmitting links being adjacent the corresponding ends and being spaced from the second set by a distance greater than the distance between the first set and the pivot means, and means connecting the follower means of one of the energy transfer mechanisms to the driver means of another energy transfer mechanism.

References Cited in the file of this patent

UNITED STATES PATENTS 1,490,936     Meyers  ---------------- Apr. 22, 1924